Jan. 9, 1968 MITITAKA YAMAMOTO ET AL 3,362,515
CARD CONTROLLED APPARATUS
Filed July 7, 1966 3 Sheets-Sheet 1
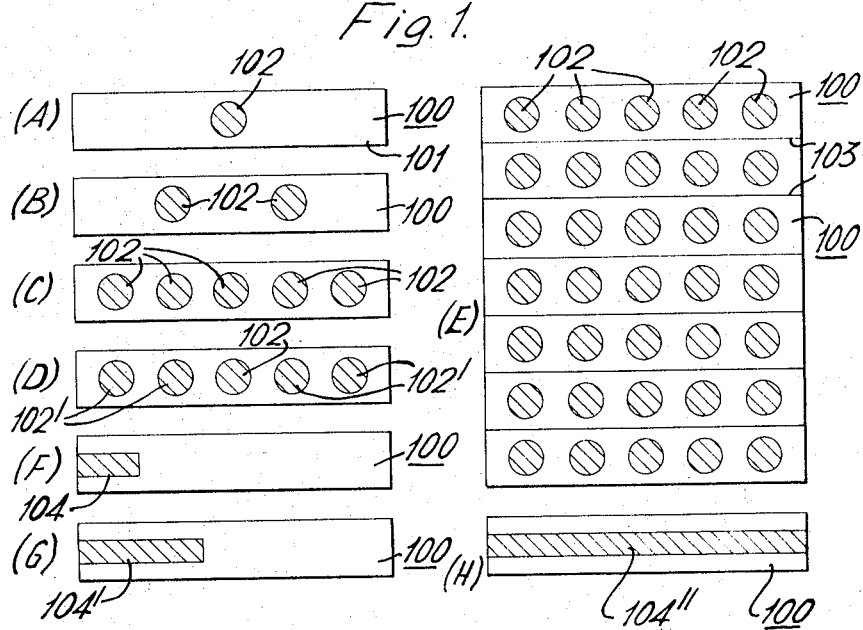
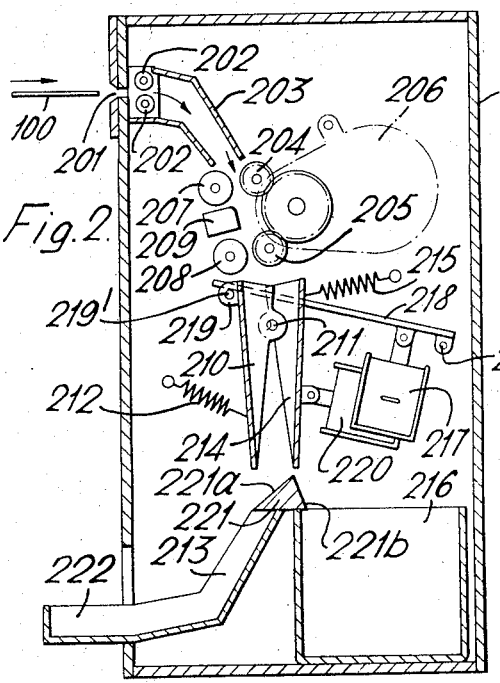
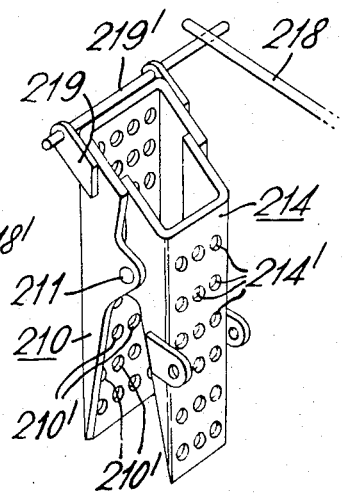
INVENTORS
MITITAKA YAMAMOTO
HIROO AKAMATSU
BY
Christensen, Sanborn, & Matthews
ATTORNEYS 3,362,515
CARD CONTROLLED APPARATUS
Mititaka Yamamoto, 17 Ryoanji Gotanda-cho, Ukyo-ku, Kyoto, Japan, and Hiroo Akamatsu, 767 Tonda-cho, Takatsuki, Osaka, Japan
Filed July 7, 1966, Ser. No. 563,552
8 Claims. (Cl. 194—4)

ABSTRACT OF THE DISCLOSURE

This application discloses a card controlled apparatus for use in vending machines and the like utilizing activating cards which have monetary value indications recorded thereon in a row along their length. The apparatus includes means for receiving and guiding the cards lengthwise into the apparatus, a detector positioned to detect the monetary value indications individually and produce electrical signals in response thereto in such a way that the number of signals indicates the monetary value of the card, and means coupled to the detector and operable in response to predetermined numbers of monetary value signals to dispense articles or render services of corresponding monetary value. Other features based on this monetary value sensitive arrangement are d'sclosed, as well as alternative forms of the activating cards and corresponding modifications in the arrangement of the apparatus, including a type of card on which the monetary value indication is a single line, and the detecting means in the apparatus includes a sampler for producing successive pulses in numbers corresponding to the length of the line on the card.

Background and summary of the invention

This invention relates to a card controlled apparatus and more particularly to an apparatus which is applicable to a vending apparatus and is controlled by particular cards instead of usual coins or the like to actuate a mechanism for dispensing articles or rendering services.

In recent years, automatic vending machines are widely used, in which upon insertion of coins various articles such as cigarette packages, candies, soft drink bottles and railway tickets are dispensed, or various kinds of services are rendered such as washing or drying clothes, cleaning of shoes, opening a wicket for admission to railway stations or theatres. In such known vending machines, insertion of coins or particular tokens is required to operate the machines, and consequently various problems or inconveniences have been involved. For example, it is necessary to test the genuineness of the coins introduced, and not only is such test not simple but also the device therefor is complicated and expensive. In addition, the purchaser must have coins at hand to utilize the machine.

In order to avoid this, a credit sales system has been proposed, according to which sellers of various articles or services previously issue credit cards to customers so that the customers can produce the articles or services offered by vending machines by inserting their credit cards into the machines. According to the system, since credit cards instead of coins are handled, the purchaser need not have any cash at hand to obtain the articles or services from the machine. However, the machine must record the names of customers who used the machine, the prices of articles sold or services rendered, so that cash can be collected from the customers afterwards. Moreover, the device for such recording generally is complicated and expensive, and collection of cash or the like requires time and disbursements.

Accordingly, it is one object of the invention to provide a card controlled apparatus which is devoid of the disadvantages and inconveniences of both coin-operated and credit card systems. The system of the invention utilizes particular type of tickets or cards which are given predetermined monetary values as recorded on the cards by a particular medium. Upon insertion of a card the machine, the monetary value of the card is read and the result of the reading is transmitted to a device for dispensing an article or rendering a service.

Another object of the invention is to provide such a card controlled apparatus as aforesaid wherein it is simple and easy to test and recognize the genuineness of the card introduced.

A further object of the invention is to make it easy to distinguish between cards of different monetary values. The particular type of cards which the apparatus of the invention utilizes are given predetermined monetary values by means of a particular recording medium, which may for example be marks printed on the cards and distinguishable from the surrounding areas. By changing the number, size, or positions of the marks, it is possible to give the cards different monetary values.

Another object of the invention is to obviate the need for provision of any such recording device as is required of credit card type of machines.

Still another object of the invention is to provide an apparatus controlled by particular cards, which may be easily applied to existing coin-controlled vending machines for selective use of cards and coins.

Other objects, features and advantages of the invention will be apparent from the following detailed description of preferred embodiments thereof with reference to the accompanying drawings, wherein:

Brief description of the drawings

FIG. 1 schematically shows different cards utilized in the apparatus of the invention;

FIG. 2 is an elevational view, in vertical section, of the mechanical portion of one embodiment of the invention;

FIG. 3 is a perspective view of a modification of the gate shown in FIG. 2;

Detailed description of the preferred embodiments

Figure 4:
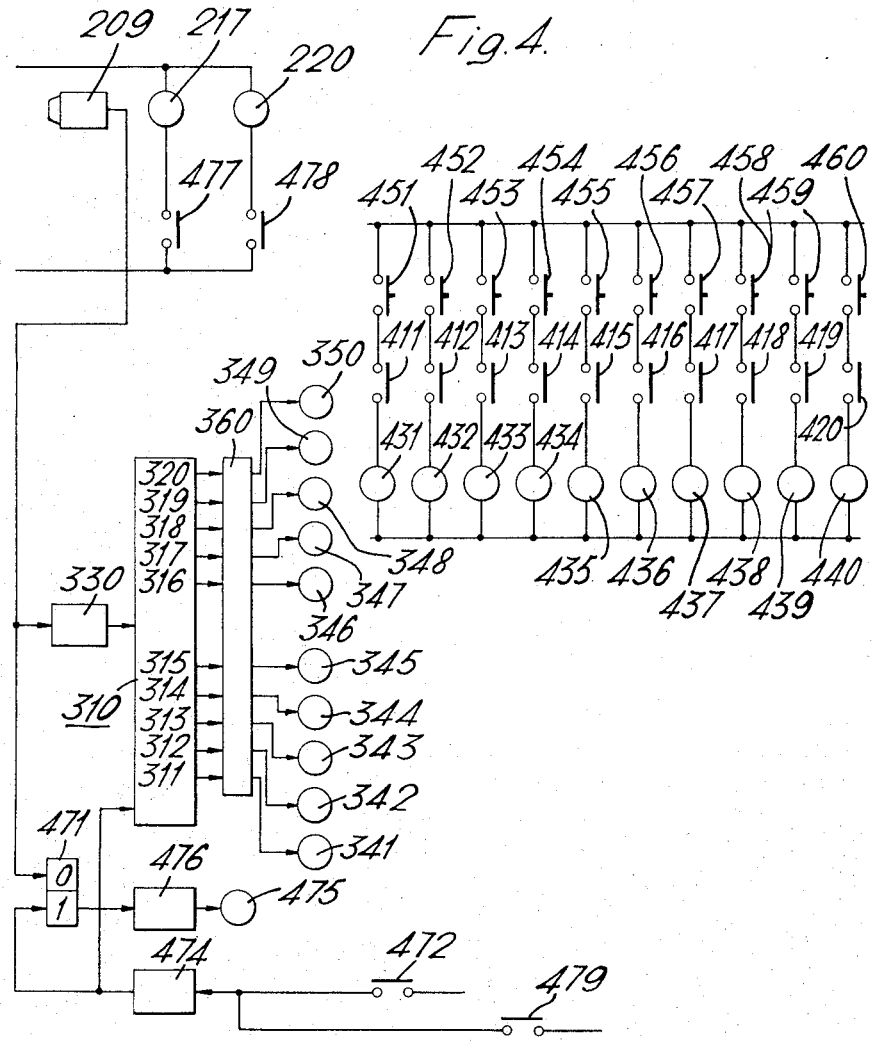
FIG. 4 is a circuit diagram of the electrical portion of one embodiment of the invention.

Referring now in detail to the drawings, first to FIG. 1, there are shown different cards or tickets each generally designated by 100. Each card comprises a base 101 made of a material resistive to climate changes, such as vinyl chloride, and is given a predetermined monetary value by a recording medium. The medium may be one or more defined areas or marks 102 on the base 101, which are printed with a particular kind of ink such as magnetic ink. The marks are shown circular, but may be of any other desired shape. The marks not only represent the monetary value given to the card, but also function as a test by which to recognize the genuineness of the card. Suppose that one mark has a value of five cents. The card A has a single mark and is given a value of five cents; the card B has two marks and consequently a value of ten cents; and accordingly, the card C has five marks 102 and consequently a value of twenty-five cents. Such simple arrangement of the marks on the cards is directly indicative of their values and may induce forgery. In order to avoid this, a card may have a plurality of marks, some of which are printed with magnetic ink, while the others are printed with usual ink of the same color as that of the magnetic ink so that it is apparently impossible to tell what value the card has, as in the card D. This card D has a single true mark 102 and four false marks 102' of the same size and color, so that it appears the same as the card C but actually it has the same value as the card A. In practice, it may be convenient to provide a sheet E including a series of cards defined by perforated lines 103 for easy separation of individual cards.

The monetary value given to a card may be represented by the length or area of a single mark as in cards F, G, and H. The card F has a single mark 104 of a unit length representing a unit monetary value. Since the card G has a mark 104' twice as long as the unit length, its value is twice the unit value. Accordingly, the card H has a mark 104" five times as long as the unit length and consequently a value five times the unit value. The arrangement may also be such that the monetary value of the card is determined by the coded arrangement of marks on the card, or holes formed therein.

FIG. 2 shows a device for receiving the card inserted into the machine, testing its genuineness and at the same time recognizing its monetary value, and accepting or rejecting it. The device comprises a casing 200 having a slot 201 into which the card is to be inserted. Inside the slot 201 a pair of guide rollers 202 are arranged for directing the inserted card into a chute 203. Below the chute two pairs of drive rollers 204, 207 and 205, 208 are arranged in generally vertically spaced relation to each other. The rollers 204 and 205 are driven by a motor 206.

Between the two pairs of rollers a detector 209 is disposed for detecting and recognizing the monetary value of the card passing by it. The detector is of a suitable construction, depending upon the nature of the recording medium on the card. If the medium is magnetic ink, the detector 209 may advantageously be a proximity switch operable in response to the magnetism of the ink. If the medium on the card is openings formed therein, the detector may comprise a light source and photosensitive elements sensitive to the light from the source passing through the openings.

Below the rollers 205 and 208, there is provided a gate or escrow device comprising a pair of doors 210 and 214 pivoted on a common pin 211. The doors 210 and 214 are at one side of the pivot biased by springs 212 and 215, respectively, to be turned clockwise about the common pin 211. The door 214 is connected at the other side of the pivot 211 to the plunger of an electromagnetic device 220 which is adapted to be energized when the card is to be accepted and which, when energized, rotates the door 214 counterclockwise about the pin 211 against the force of the spring 215. The other door 210 is provided with a pair of ears 219 which support a rod 219'. A lever 218 is pivoted at one end 218' and at the other free end bearing on the rod 219' and intermediate its length connected to the plunger of an electromagnetic device 217. The electromagnet 217 is energized when the detector 209 recognizes the card introduced as genuine. When the electromagnet 217 is energized, the lever 218 is turned counterclockwise about the pin 218' to push on the rod 219', thereby moving the door 210 counterclockwise about the pin 211 against the force of the spring 212 until the lower end of the door 210 contacts the lower end of the other door 214 which is held stationary at this time, thereby forming a bucket, in which the card dropping from between the rollers 208 and 205 is temporarily retained. Upon deenergization of the electromagnet 217 or energization of the other electromagnet 220, the door 210 or 214 is turned to open the bucket to drop the card. Below the escrow device or gate there is provided a divider 221 of a generally triangular cross-section having an apex positioned just below the lower edge of the door 214 and a pair of surfaces 221a and 221b sloping down from the apex at opposite sides thereof toward a rejection chute 213 and an acceptance box 216, respectively.

So long as both of the electromagnets remain deenergized, the card drops through the open gate onto the slope 221a of the divider 221 to be directed into the chute 213 and finally returned to the purchaser at an exit tray 222 formed at the outer end of the chute. Under the condition that the door 210 is closed upon energization of the electromagnet 217 so as to form a bucket together with the other door 214, when the electromagnet 217 is deenergized, the card temporarily held in the bucket also drops into the chute 213. On the contrary, under the same condition, when the electromagnet 220 is energized, the door 214 is moved counterclockwise on the pin 211 to open the gate so that the card will drop into the acceptance box 216.

It will be seen that since the card passes through the two pairs of rollers in contact therewith, if it is made of synthetic resin, it becomes electrostatically charged. This may well cause the card to stick to the inside surface of the door 210 or 214, so that it cannot drop even when the gate is opened. To prevent this, the doors 210 and 214 are preferably formed with a number of small perforations 210' and 214' as shown in FIG. 3. The perforations reduce the contacting area of the doors with the card surface and consequently prevent the card from sticking thereto. Such arrangement obviates the need for adding to the material of the card any anti-electrostatic agent, or providing along the path of the card before the gate a device for removing the electrostatic charge from the card.

Now the control circuit of the apparatus of the invention will be described. Let it be assumed that the recording medium on the card is magnetic ink; that the three kinds of cards A, B and C are acceptable to the apparatus, having monetary values of five, ten and twenty-five cents, respectively; that the apparatus handles ten different kinds of articles priced at five, ten, fifteen, twenty, twenty-five, thirty, thirty-five, forty, forty-five and fifty cents; and that selection of articles is to be made after insertion of a card or cards.

Referring to FIG. 4, the detector 209 is so constructed that as it detects one mark on the card, it produces one pulse. Accordingly, when the card A has been introduced, the detector produces one pulse; and when the card C has been introduced, the detector produces five pulses. The pulses are applied to a Schmitt circuit 330, where they are properly shaped and then applied to a decimal counter 310 having ten output lines 311 through 320, upon one of which appears an output depending upon the number of pulses counted by the counter. The output signal from the counter is amplified by an amplifier 360, and the amplified signal energizes one of ten relays 341 through 350 having contacts 411 through 420, respectively. The contacts are connected in series with solenoids 431 through 440 and push button switches 451 through 460, respectively. The ten solenoids actuate mechanisms (not shown) for dispensing ten different kinds of articles, respectively, and the ten switches 451 through 460 are adapted to be selectively pushed by a purchaser for selection of the kind or kinds of articles he or she wishes to purchase.

A flip-flop circuit 471 is so arranged that normally its "1" section produces an output, but that when a pulse is applied to its "0" section, the output from the "1" section disappears and under this condition, when a pulse from a differential circuit 474 is applied to the "1" section, it again produces an output. The differential circuit 474 has its input connected to a normally open switch 472 adapted to be closed when any one of the solenoids 431 through 440 has been energized.

Parallel with the switch 472 there is connected a normally open switch 479 which is adapted to be closed by the purchaser who, after having inserted a card, wishes to refrain from the purchase.

The output from the "1" section of the flip-flop circuit 471 is connected through a NOT POWER circuit 476 to an electromagnetic relay 475 having a contact 477 connected in series with the electromagnetic device 217. The other electromagnetic device 220 is connected in series with another normally open switch 478 which is adapted to be closed, upon actuation of any one of the solenoids 431 through 440, for a predetermined period of time, after which it is opened again.

Suppose that a purchaser has introduced a card B having two marks 102 on it to purchase an article of 10 cents. The card passes through the pair of rollers 202 into the chute 203 and between the upper pair of rollers 204 and 207 to pass by the detector 209, which detects the two marks on the card and produces two pulses. These pulses are applied through the Schmitt circuit 330 to the counter 310, which counts the number of pulses to produce an output at the second output line 312 to operate the relay 342. The operation of this relay means that the card introduced has a value of 10 cents, and causes the switch 412 to be closed.

The first of the two pulses produced by the detector 209 causes the output from the "1" section of the flip-flop circuit 471 to disappear, so that the NOT POWER circuit 476 produces an output to operate the relay 475, whereupon the switch 477 is closed to energize the magnet 217. This causes the door 210 to close the gate to the chute 212, so that the card is retained in the bucket formed by the two doors 210 and 214. Then, when the article selection switch 452 has been pushed by the purchaser, the solenoid 432 is energized to dispense an article of 10 cents to the purchaser's hand. The energization of the solenoid 432 closes the switch 472, whereupon a reset signal is applied from the differential circuit 472 to the counter 310 to reset it, and at the same time the switch 478 is closed to energize the electromagnet 220 to open the door 214, thereby dropping the card in the bucket into the acceptance box 216.

When the cancel button 479 is pushed after having introduced a card before pushing the selection push button, the door 210 is opened to drop the card into the chute 213 and thence to the tray 222, and at the same time both the counter 310 and the flip-flop 471 are reset to be ready for next operation.

Suppose that one has introduced two 10-cent cards and one 25-cent card to purchase an article of 45 cents. When the first 10-cent card has been introduced, the counter 310 receives two pulses, and when the second 10-cent card has been introduced, the counter receives two more pulses. Thus, when the 25-cent card has been introduced, the counter receives five more pulses. As a result, an output appears at the ninth output line 319 of the counter. Under this condition, upon pressing of the selection switch button 459, the solenoid 439 is energized to dispense an article of 45 cents. In a similar manner, when one 5-cent card, one 10-cent card and one 25-cent card have been introduced, the counter produces an output at the eighth output line 318, which operates the relay 348. In this manner, no matter how many cards of what value (up to the maximum price) may have been introduced in what order, the counter receives the same number of pulses as the total number of the marks on the cards, so that the purchaser can obtain an article equivalent to the total value of the cards introduced.

Figure 5:
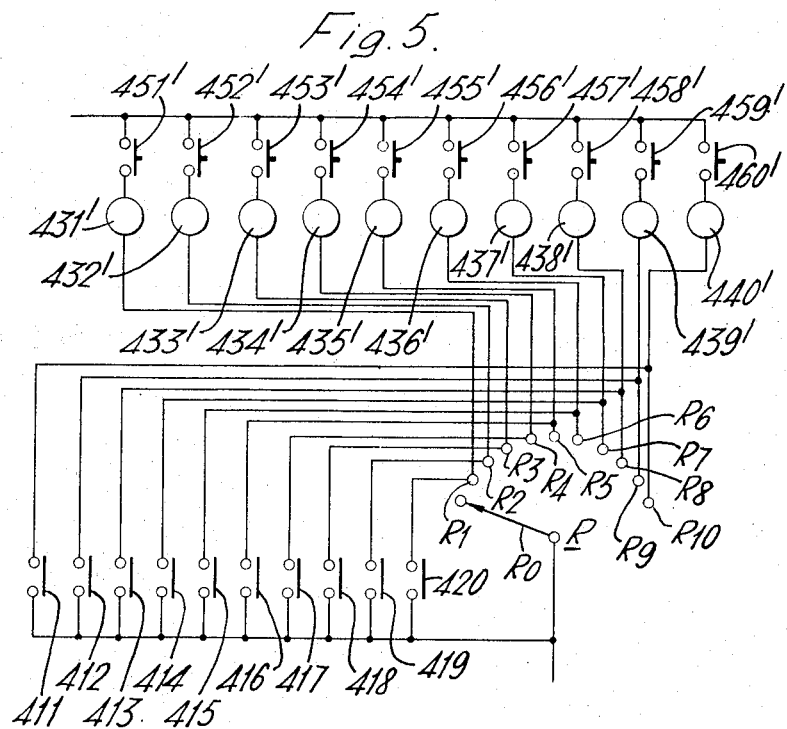
FIG. 5 is a circuit diagram of the electrical portion of a conventional coin-operated vending machine to which the invention is applied.

The apparatus of the invention may also be applied to a conventional coin-operated machine. An example of such application is shown in FIG. 5, showing a rotary switch R having a movable contact arm Ro and ten stationary contacts R1 through R10 corresponding to, e.g., 5, 10, 15, 20, 25, 30, 35, 40, 45 and 50 cents, respectively. The arrangement is such that when coins have been introduced into the machine, a detector (not shown) detects the coins and the arm Ro is rotated to contact that one of the stationary contacts corresponding to the total value of the coins introduced. Article selection switches 451′ through 460′ and article dispensing solenoids 431′ through 440′ corresponding to 5-cent, 10-cent . . . and 50-cent articles, respectively, are connected in series with the ten stationary contacts R1 through R10 of the rotary switch R. If the contacts 411 through 420 of relays 341 through 350 of the arrangement of the invention in accordance with FIGURE 4 are connected in parallel with the above series circuits, respectively, the machine can be operated either by the usual coins or by cards in accordance with the invention.

Figure 6:
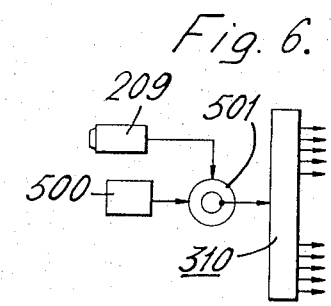
FIG. 6 is a circuit diagram of a modification of a portion of FIG. 4.

If the cards F G and H in FIG. 1 are to be used, in which the length of the single mark on each card determines the monetary value thereof, the circuit as shown in FIG. 6 may be used for recognizing the value of the cards. Here, the output of the detector 209 is connected to one input terminal of an AND circuit 501, to the other input terminal of which is connected the output of a flicker relay 500 or sampler which is so designed to produce a series of output pulses at predetermined constant intervals to in effect sample the detector output, and the output of the AND circuit is applied to the decimal counter 310. The arrangement is such that the card introduced passes by the detector 209 at a constant speed, and the flicker relay 500 produces one pulse for one unit length of the mark on the card passing by the detector.

Alternatively, the period of time during which the detector continues operation in response to the mark on the card passing by the detector at a constant speed may be utilized as a test to recognize the value of the card.

In case the monetary value of a card is given in the form of openings or the like medium arranged on the card according to a predetermined code, a plurality of detectors may be provided so that those of the detectors which correspond to the coded arrangement of the medium on the card produce signals, which may be utilized to recognize the monetary value of the card.

The apparatus of the invention has various advantages over prior art apparatus, including the following:

(1) Since the cards are given their respective monetary values by a particular recording medium, the test for the genuineness of the cards can be made by simply recognizing the presence of such recording medium on the card introduced.

(2) The recording medium not only represents the monetary value of the card, but also functions as a test by which to recognize the genuineness of the card. Consequently, a detector for recognizing the monetary value of the cards can also function as a tester of its genuineness. Of course, the card may be provided with an independent medium for expressing its genuineness, and a separate detector for that medium may be provided. In either case, the system of the invention makes the genuineness test simple and easy.

(3) In prior art systems employing usual coins, the monetary values of coins must be recognized by different factors, that is, the size, weight, diameter and material of the coins introduced. In accordance with the invention, however, a single factor has only to be detected, that is, the number, arrangement, or length or area of the recording medium on the card in order to recognize the monetary value thereof.

(4) The cards of the invention are handed to purchasers in exchange for cash or the like. Discounts may be made to enhance the willingness to buy. The system of the invention requires no such recording means for recording the names of purchasers, the prices of articles sold, etc. as is necessary with conventional credit card type of machines.

(5) The cards of different values may be introduced into the machine in any desired order, and when so introduced they are detected by the same and single detector, so that the detecting device is much simplified.

(6) As a card is introduced, its monetary value is recognized and a corresponding signal is produced to actuate the article dispensing mechanism. The signals themselves are similar to those in coin-operated machines. This means that it is possible to apply the system of the invention to existing coin-controlled apparatus to make the latter operable selectively by coins or cards of the invention.

Preferred embodiments of the invention having been illustrated and described above, but it should be noted that the invention is not limited thereto, and that there are many possible modifications and changes within the scope of the invention as defined in the appended claims.

What we claim is:

1. A card controlled apparatus comprising activating cards each having a monetary value determined by indications recorded thereon in a row along the length of said card, means for receiving and guiding said card lengthwise into said apparatus, a detector positioned adjacent to the path of the card in said receiving means, said detector being operable to detect said indications individually and produce electrical signals in response thereto, whereby the number of such signals produced in response to said indications corresponds to the monetary value of said card, and means coupled to said detector and operable in response to predetermined numbers of said signals to dispense articles or render services of corresponding monetary value.

2. The apparatus defined in claim 1 wherein said monetary value indications on said card comprise contiguous segments of a single line lengthwise of said card, said receiving means includes means for moving said card past said detector at a constant speed, and said detector includes sampling means operative at regular intervals during passage of said card to detect the presence of said line and provide said electrical signals in response thereto, and wherein said apparatus further includes counting means responsive to said sampling means and operable to store the number of monetary value indicating samples received by said sampling means.

3. The apparatus defined in claim 1 wherein said dispensing means includes a counter responsive to said detector and having a plurality of outputs corresponding respectively to different monetary values of cards receivable by said apparatus and adapted to be energized individually in accordance with monetary values detected, and a plurality of dispensing devices respectively coupled to said outputs for dispensing articles or services corresponding in price to the monetary values associated therewith, said apparatus further including a card return path and a card acceptance path, an escrow device adapted to hold said card after the same passes said detector and adpated to eject said card alternatively into said rejection path or said acceptance path, card return means coupled to said escrow device and manually operable to effect ejection of said card into said return path, and means coupled to said dispensing means and to said escrow device and operable in response to operation of one of said dispensing devices to eject said card into said acceptance path.

4. The apparatus defined in claim 1 wherein said card includes a plurality of visible, apparent monetary value indications thereon, one or more of said apparent indications having invisible indicating means embodied therein and to which said detector is responsive as actual monetary value indications for activating said apparatus.

5. The apparatus defined in claim 4 wherein said invisible indicating means comprises magnetic ink and said detector includes means responsive to said magnetic ink.

6. The apparatus defined in claim 1 wherein said cards are joined along perforated lines in a single sheet, separable along said perforated lines for individual reception into said apparatus.

7. A card controlled apparatus comprising, in combination with cards each being given a predetermined different monetary value by means of recording medium: a slit for receiving a card; means including drive rollers for transferring said card along a path; a detector disposed laterally of said path for detecting the recording medium on said card as it is being moved along said path; gating means disposed in said path posterior to said detector and comprising a pair of normally open door members; means operable in response to said detector for producing an electrical signal corresponding to the monetary value of said card as represented by said recording medium; means for dispensing articles or rendering services; means operable in response to said electrical signal for actuating said last-named means to dispense an article or render service; means controlled by said detector for moving one of said door members to close said gating means when said detector recognizes said card as being genuine so as to retain said card in said gating means; means controlled by said actuating means for moving the other of said door members to open said closed gating means so as to drop said card held therein; an acceptance box for receiving said card dropping from said opened gating means; and a chute for directing said card to a return tray when said card has not been retained by said gating means.

8. The apparatus as defined in claim 7, wherein said door members are perforated.

References Cited

UNITED STATES PATENTS

| | | | |
|---|---|---|---|
| 2,659,470 | 11/1953 | Du Pont | 194—4 |
| 2,714,201 | 7/1955 | Whitehead | 194—4 |
| 2,907,435 | 10/1959 | Oakes | 194—4 |
| 2,983,354 | 5/1961 | Ember et al. | 194—4 |
| 3,030,008 | 4/1962 | Jensen | 232—57.5 |
| 3,067,936 | 12/1962 | Kasper et al. | 194—9 X |
| 3,171,020 | 2/1965 | Lord. | |
| 3,173,531 | 3/1965 | Powers et al. | 194—4 |
| 3,209,881 | 10/1965 | Goalby et al. | 194—4 |
| 3,282,388 | 11/1966 | Lester et al. | 194—4 |

FOREIGN PATENTS 767,758  2/1957  Great Britain.

SAMUEL F. COLEMAN, *Primary Examiner.*

UNITED STATES PATENT OFFICE
CERTIFICATE OF CORRECTION

Patent No. 3,362,515                                        January 9, 1968

Mititaka Yamamoto et al.

It is hereby certified that error appears in the above numbered patent requiring correction and that the said Letters Patent should read as corrected below.

In the heading to the printed specification, between lines 6 and 7, insert the following:

Claims priority, application Japan, July 10, 1965, 40-41,394

Signed and sealed this 18th day of February 1969.

(SEAL)
Attest:

Edward M. Fletcher, Jr.                                EDWARD J. BRENNER
Attesting Officer                                          Commissioner of Patents